Jan. 8, 1946. J. W. SIMMONS 2,392,704
FASTENER
Filed Aug. 28, 1944
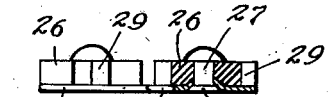
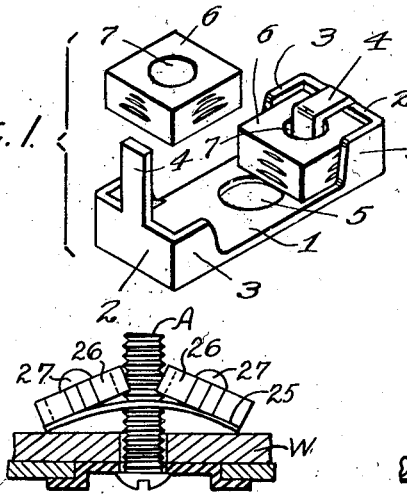
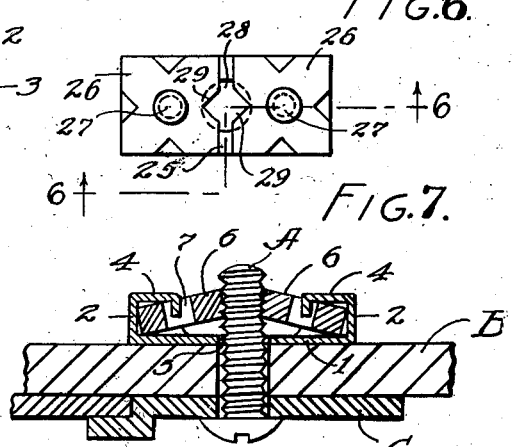
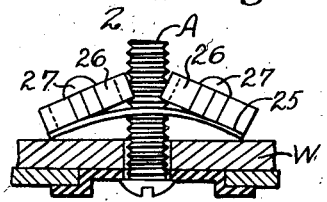
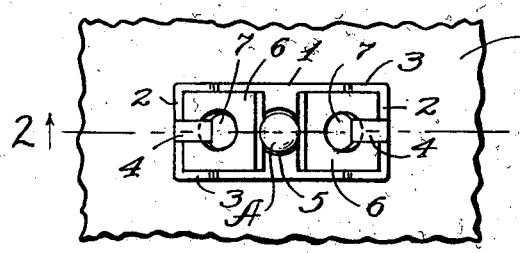
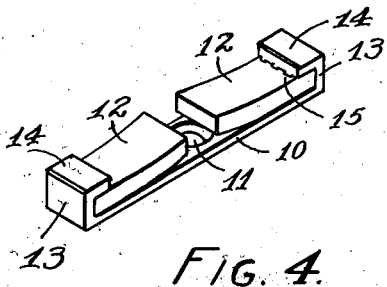
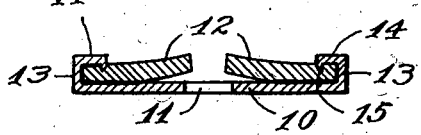
INVENTOR
John W. Simmons
BY
ATTORNEYS.

Patented Jan. 8, 1946

2,392,704

UNITED STATES PATENT OFFICE 2,392,704

FASTENER

John W. Simmons, Cleveland Heights, Ohio

Application August 28, 1944, Serial No. 551,475

19 Claims. (Cl. 85—36)

This invention is in the class of quick acting fasteners. Broadly, it consists of a base member or frame member made of sheet metal or other suitable material so formed that an entering element, such as a screw, may be projected through the plane of said member; and holding parts or jaws—desirably two, arranged in opposed relation to each other—that are made of fiber or other impressionable material and are attached to said member so as to be capable of yielding with respect thereto when the entering element is engaged between them, the holding parts or jaws being thereafter placed under compression, as, in the case of a threaded entering element, by turning said element in a direction to feed the element engaging ends of said parts or jaws toward the plane of the base or frame member. During this action, the contacting areas or threads of the entering element embed themselves in the holding parts or jaws. In this connection it should be explained that by "impressionable" is meant a material relatively softer than that of the entering element.

The subject matter of the present case is distinguished from that of my copending application Serial No. 544,165, filed July 10, 1944, by the fact that here the entering element is contacted solely by impressionable material in its cooperation with the novel holding part or parts of the fastener, whereas, in the earlier case, the holding parts of impressionable material are auxiliary to metallic holding parts or jaws.

An object of this invention is the provision of a simple and relatively inexpensive fastener of the class aforesaid wherein the element contacting portion of a holding part or jaw consists solely of impressionable material so that the contacted area of the entering element embeds itself in said material thereby to enhance the hold of the fastener upon said element. When fiber or similar impressionable material is employed, the likelihood of the holding part or jaw relaxing its hold on the entering element because of vibration is minimized, due to the manner in which said parts interengage and the shock absorbing quality of said material.

Another object of the invention is the provision of a quick acting fastener characterized by a holding part or jaw of impressionable material that may be adjusted with respect to the base or frame member so that a fresh portion of such jaw or part may be presented to the entering element after a previously used portion has become more or less ineffective through wear; and a further purpose is to provide a simple construction by which said adjustment is facilitated.

These and other objects and advantages are realized in the embodiments of the invention shown in the accompanying drawing, which are to be regarded as illustrative rather than as limiting.

In the drawing, Fig. 1 is a perspective view of a quick acting fastener incorporating the invention and showing it as though it were in the process of fabrication before the second holding part or jaw is emplaced; Fig. 2 shows said fastener applied to an entering element in the form of a standard screw by which two articles are connected together, the fastener being shown in central longitudinal section, as indicated by the line 2—2 of Fig. 3; Fig. 3 is a plan view of what is shown in Fig. 2; Fig. 4 is a perspective view, and Fig. 5 a central longitudinal section, through another form of the invention; Figs. 6 and 7 are, respectively, a side elevation, partly in section, and a plan view of still another embodiment of the invention, and Fig. 8 is an elevational view of the fastener shown in Figs. 6 and 7, illustrating the action of the fastener while it is being applied to a screw by which two articles are connected together.

The base or frame member of the fastener shown in Figs. 1 to 3 is designated 1, and it consists of a flat rectangular body portion or plate from the ends of which walls 2 rise in substantially right angular relation to said plate. Brief side walls 3 extend upwardly from each lateral edge of the plate adjacent the opposite ends thereof and are integrally united with the previously mentioned walls 2, and tongues 4 project from the upper edges of the latter walls. The unit comprising the foregoing parts is preferably drawn from a blank of sheet metal; and the body portion of the base or frame member has a central aperture 5.

6 designates holding parts or jaws that are made of impressionable material. This material may be fiber, lead, or other suitable metal or metal alloy, or a compound including metal. Each holding part or jaw, in the present construction, is square in plan and of a size to fit between the opposed side walls 3 in a position to engage the abutment provided by the adjacent end wall 2. The proportions are such that when the holding parts or jaws engage the walls 2 their edges remote from said walls overhang the aperture 5. Each holding part or jaw is provided with a central recess or hole 7 into which the end of the adjacent tongue 4 is adapted to be extended when said tongue is bent inwardly and its end turned downwardly. Here, again, the parts should be so proportioned and related that the holding parts or jaws are free to rock with respect to the base or frame member, the tongues 4 serving to prevent disconnection of the holding parts or jaws from the base or frame member.

With the fastener thus constructed it may be applied, as illustrated in Figs. 2 and 3, to the entering element A, which may consist of a standard screw. Said element is first projected through aligned holes in the articles B and C that are to be connected together, and thence through the aperture 5 of the base or frame member 1 and between the holding parts or jaws 6, said parts or jaws yielding to this action, in part by virtue of the inherent resiliency of the tongues 4. In the initial application of the fastener to the entering element, the adjacent ends of the holding parts or jaws may be spaced further from the base or frame member than illustrated in Fig. 2, and they are drawn to the position shown by the turning of the entering element in a direction to feed them toward the base or frame member. As said holding parts or jaws approach said member, they are placed under compression between the entering element and the abutments provided by the walls 2, and the contacted areas or threads of the entering element embed themselves in the holding parts or jaws.

To disengage the fastener from the entering element the latter is turned in a reverse direction so as to withdraw it from between the holding parts or jaws; and if, through repeated use, the element contacting portions of the holding parts or jaws become worn to such an extent that their effectiveness is impaired, the tongues 4 may be retracted sufficiently to permit removal of the holding parts or jaws so that they may be turned to present fresh edges to the entering element. By said parts or jaws being square, four such adjustments are possible.

The embodiment of the invention illustrated in Figs. 4 and 5 consists of a base or frame member 10, having an aperture 11 for the passage of the entering element; and secured to the ends of the base or frame member are tongue-like holding parts or jaws 12 of fiber or other impressionable material. Said holding parts or jaws are here shown as secured to the base member by having the end portions of the strip of metal from which said member is made turned upwardly and thence inwardly, to provide end walls 13 and flanges 14, the edges of the latter desirably being serrated or formed with teeth 15 that penetrate the impressionable material and thus hold the parts or jaws 12 firmly in position. Said parts or jaws are of such length that, while their outer ends bear against the abutments provided by the walls 13, their inner ends overhang the adjacent sides of the aperture 11.

The manner of use and mode of operation of the form of the invention shown in Figs. 4 and 5 will be readily understood from what has been said in these respects of the first described embodiment.

In Figs. 6, 7 and 8 is illustrated a fastener constructed in accordance with the invention and comprising a base member 25, and holding parts or jaws 26. The former is made of relatively thin flexible material, such as resilient sheet steel, and the jaws or holding parts 26 are of impressionable material, such as fiber. Each jaw is attached to the base member by a rivet 27, or by other suitable means, desirably located centrally of the jaw so that the jaw, while being held by friction in any position to which it is adjusted, is capable of being turned to present new portions to an entering element projected through an aperture 28 in the base member, in case formerly used portions of the jaw become so badly worn as to adversely affect their grip upon the entering element. As shown, the element engaging sides of the jaws are provided with V-notches, as indicated at 29, so that two bearing areas are provided for contact with each of the opposite sides of the entering element. To avoid protuberances on the underside of the fastener, the adjacent ends of the rivets 27 are formed with flat tapered heads, and the material of the base member about the rivet holes is flanged inwardly at a proper angle—in other words, given a sort of eyelet formation—to receive the tapered heads of the rivets, one such head being shown at 30 in Fig. 6. The bores of the jaws are countersunk to receive the displaced or flanged portions of the base member, thus providing abutment means that aids in resisting the outward thrust of the jaws when the fastener is in use.

In the application of the last described fastener to a screw that constitutes the entering element A, the base member 25 flexes or arches as the fastener is forced downwardly over the screw (see Fig. 8), the jaws separating sufficiently to receive the screw between them and dragging over the threads thereof as the fastener is pushed along the screw until its ends contact the work W in connection with which the fastener is used. Thereafter, by turning the screw in the proper direction, the jaws are fed toward the base member while the base member resumes a straight, or substantially straight, condition against the work.

Obviously, in all forms of the invention, the jaw of impressionable material may be notched or otherwise treated to increase the bearing area thereof upon the entering element, as shown in Figs. 6 and 7; or, as illustrated in Fig. 1, the element contacting faces of the jaws may be formed with thread-like depressions to improve the initial coaction between the threaded entering element and the jaws, as will be readily understood.

Having thus described my invention, what I claim is:

1. A quick acting fastener comprising a frame member constructed to permit the projection of an entering element freely through the plane thereof and provide clearance between itself and said element, a holding part made of material differing from the material of the frame member and softer than that of the entering element attached to said frame member for contact with a side of the element, a second holding part carried by the frame member and arranged for engagement with another side of said element, the first mentioned holding part being capable of yielding with respect to the frame member when the entering element is projected through the plane of the latter and between said first mentioned holding part and the other holding part, and being adapted to be placed under compression when moved by the application of force thereto toward the plane of the frame member.

2. A quick acting fastener comprising a frame member constructed to permit the projection of an entering element freely through the plane thereof and provide clearance between itself and said element, and opposed holding parts made of material differing from the material of the frame member and softer than that of the entering element attached to the frame member for contact with opposite sides of the entering element, said holding parts being capable of yielding with respect to the frame member in a direction away from the plane thereof when an entering element is projected through said plane and between said parts, and being adapted to be placed under compression by the application of force thereto in a direction toward the plane of the frame member.

3. A quick acting fastener comprising a base member having an aperture of a size to permit the projection of an entering element therethrough with clearance, a holding part made of material differing from the material of the base member and softer than that of the entering element attached to the base member for contact with a side of said entering element, and a second holding part carried by the base member for engagement with another side of the entering element, the first mentioned holding part being adapted to be placed under compression when the portion thereof engaging the entering element is forced toward the plane of the base member.

4. A quick acting fastener comprising a base member having an aperture of a size to permit the projection of an entering element therethrough with clearance, and opposed jaws made of material differing from the material of the base member and softer than that of the entering element attached to the base member for contact with the opposite sides of said element, said jaws being adapted to be placed under compression when the portions thereof that are in engagement with said element are forced toward the plane of the base member.

5. A quick acting fastener comprising a base member having an aperture of a size to permit the projection of an entering element therethrough with clearance, abutments incorporated in the base member on opposite sides of said aperture, a pair of jaws made of material differing from the material of the base member and softer than that of the entering element engaged at one of their edges with said abutments and arranged with their opposite edge portions overlying the aperture, and means loosely connecting said jaws to the base member.

6. A quick acting fastener comprising a base member having an aperture of a size to permit the projection of an entering element therethrough with clearance, abutments incorporated in the base member on opposite sides of said aperture, a pair of jaws made of material differing from the material of the base member and softer than that of the entering element engaged at one of their edges with said abutments and arranged with their opposite edge portions overlying said aperture, and means loosely connecting said jaws to the base member and yieldingly opposing movement of said edge portions in a direction away from said member.

7. In a quick acting fastener, a plate-like base member having an aperture of a size to permit the projection of an entering element therethrough with clearance, walls drawn up from the ends of said member, jaws made of material differing from the material of the base member and softer than that of the entering element arranged on the base member to bear at one of their edges against said walls and adjacent their opposite edges to overlie said aperture, and means connecting the jaws to the base member.

8. In a quick acting fastener, a base member consisting of a plate having an aperture of a size to permit the projection of an entering element therethrough with clearance, walls drawn up from the ends of said plate, jaws made of material differing from the material of the base member and softer than that of the entering element mounted on the base member and arranged to bear at one of their edges against said walls while their opposite edge portions overlie the said aperture, and tongues extending from said walls over the jaws, the jaws having recesses and said tongues being projected downwardly into said recesses.

9. A quick acting fastener comprising a base member having walls rising from the ends thereof and other walls extending from the ends of the first mentioned walls along the sides of the base member, the base member having an aperture intermediate its ends through which an entering element is adapted to be projected, and jaws consisting of square blocks of material softer than that of the entering element adapted to rest upon the base member with their side portions adjacent the ends of said member loosely fitting between said side walls and arranged to bear against the end walls while their opposite side portions overlie said aperture, said jaws having recesses at substantially the center thereof, and tongues extending inwardly from the end walls and having their inner ends projected toward the base into said recesses.

10. A quick acting fastener comprising a base member having an aperture intermediate its ends through which an entering element is adapted to be projected with clearance, opposed jaws made of material differing from the material of the base member and softer than that of the entering element arranged with their outer ends adjacent the ends of the base member and their inner ends overlying said aperture, and means attaching said jaws to the base member.

11. A quick acting fastener comprising a base member having an aperture intermediate its ends through which an entering element is adapted to be projected with clearance, opposed jaws made of material differing from the material of the base member and softer than that of the entering element arranged with their outer ends adjacent the ends of the base member and their inner ends overlying said aperture, parts integral with the base member extending upwardly from the ends of said member and thence inwardly over the jaws for clamping the outer ends of the jaws to the base member.

12. A quick acting fastener comprising a base member having an aperture intermediate its ends through which an entering element is adapted to be projected with clearance, opposed jaws made of material differing from the material of the base member and softer than that of the entering element arranged with their outer ends adjacent the ends of the base member and their inner ends overlying said aperture, parts integral with the base member extending upwardly from the ends of said member and thence inwardly over the jaws for clamping the outer ends of the jaws to the base member, said parts having teeth that are embedded in the material of the jaws.

13. A quick acting fastener comprising a base member of a form to permit passage of an entering element freely through the plane thereof and provide clearance between itself and said element, and holding parts made of impressionable material mounted on the base member and providing the sole means of contact between the fastener and entering element, the element contacting portions of said holding parts and the base member being relatively movable toward and from each other.

14. A quick acting fastener comprising a base member of a form to permit passage of an entering element freely through the plane thereof and provide clearance between itself and said element, and holding parts made of impressionable material mounted on the base member and providing the sole means of contact between the fastener and entering element, the element contacting portions of said holding parts being movable toward and from the plane of the base and being biased toward said plane.

15. A quick acting fastener comprising a base member of flexible material having an aperture for the passage of an entering element, jaws of impressionable material disposed on the base member and arranged for contact with the opposite sides of an entering element projected through the aperture, and attaching means connecting the jaws to the base member in such manner that the jaws may be turned to present different parts thereof to the entering element.

16. A quick acting fastener comprising a base member of resilient metal having an aperture intermediate its ends, jaws of impressionable material disposed on the member in a position to engage the opposite sides of an entering element projected through said aperture, said jaws having bores substantially normal to the plane of the portions of the base member on which they are disposed, the base member having holes aligned with said bores, and rivets extending through the bores and holes and connecting the jaws to the base member.

17. A quick acting fastener comprising a base member of resilient metal having an aperture intermediate its ends, jaws of impressionable material disposed on the member in a position to engage the opposite sides of an entering element projected through said aperture, said jaws having bores substantially normal to the plane of the portions of the base member on which they are disposed, the base member having holes aligned with said bores, and rivets extending through the bores and holes and connecting the jaws to the base member, the bores of the jaws being counterbored on the underside of the jaws and the base member being provided with an upwardly extending flange about each of said holes that fits into the counterbore of the corresponding jaw.

18. A quick acting fastener comprising a base member of a form to permit passage of an entering element through the plane thereof, and holding parts made of impressionable material mounted on the base member and providing the sole means of contact between the fastener and entering element, the element contacting portions of said holding parts and the base member being relatively movable toward and from each other and said portions having indentations into which parts of the entering element project.

19. A quick acting fastener comprising a base member having an aperture intermediate its ends, structures incorporated in the base member adjacent the ends thereof providing inwardly opening sockets, and jaws of impressionable material having their outer ends in said sockets and their inner ends disposed in a position to engage the opposite sides of an entering element projected through said aperture.

JOHN W. SIMMONS.